(12) United States Patent
Swindlehurst et al.

(10) Patent No.: US 7,043,017 B2
(45) Date of Patent: May 9, 2006

(54) KEY STREAM CIPHER DEVICE

(75) Inventors: Richard J. Swindlehurst, Phoenix, AZ (US); Joel D. Feldman, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 874 days.

(21) Appl. No.: 09/953,665

(22) Filed: Sep. 13, 2001

(65) Prior Publication Data

US 2003/0091185 A1    May 15, 2003

(51) Int. Cl.
  *H04L 9/06* (2006.01)
(52) U.S. Cl. ............................. 380/29; 380/37; 380/43
(58) Field of Classification Search .................. 380/37
  See application file for complete search history.

(56) References Cited

U.S. PATENT DOCUMENTS

| | | | |
|---|---|---|---|
| 4,004,283 A | * | 1/1977 | Bennett et al. ............. 710/262 |
| 4,584,640 A | * | 4/1986 | MacGregor et al. ........ 707/200 |
| 5,008,935 A | * | 4/1991 | Roberts ....................... 380/29 |
| 5,724,428 A | * | 3/1998 | Rivest .......................... 380/37 |
| 6,088,800 A | * | 7/2000 | Jones et al. ................. 713/189 |
| 6,389,534 B1 | * | 5/2002 | Elgamal et al. ............. 713/164 |
| 6,549,622 B1 | * | 4/2003 | Matthews, Jr. ............... 380/29 |
| 6,694,430 B1 | * | 2/2004 | Zegelin et al. .............. 713/160 |
| 6,873,707 B1 | * | 3/2005 | Batcher ....................... 380/255 |

OTHER PUBLICATIONS

Schneier, "Applied Cryptography," 1996, pp. 397-398.*

* cited by examiner

*Primary Examiner*—Gregory Morse
*Assistant Examiner*—Matthew Heneghan

(57) ABSTRACT

A symmetric key stream processor 60 that encrypts and decrypts text in accordance with the RC4 algorithm has a main processing block 62 and a host interface 64. The main processing block 62 includes an Sbox memory 78 implemented with a synchronous dual-port RAM and an encryption logic block 80 with a finite state machine. The dual port memory architecture is used for efficiency during permutation and message processing.

14 Claims, 3 Drawing Sheets

KEY STREAM CIPHER DEVICE

BACKGROUND OF THE INVENTION

The present invention is directed to key stream ciphers and more particularly to a hardware architecture that supports the RC4 algorithm.

A cipher is a cryptographic algorithm used for encryption and decryption. A stream cipher is a type of encryption algorithm that encrypts data using a keystream, which is a sequence of bits used as a key. More specifically, a stream cipher, as opposed to a block cipher, processes a variable-length message stream. In a symmetric key algorithm, the same key is used for both encryption and decryption of data. Encryption is accomplished by combining the keystream with the plain text, usually by exclusive-ORing (XOR) the keystream and the plain text. Decryption is accomplished similarly, by combining (XORing) the keystream with the cyphertext.

The most widely used stream cipher today is RC4 (RC4 is a registered trademark of RSA Security Inc.), which was developed in 1987 by Ron Rivest. RC4 is used in many commercial cryptography products for file encryption and secure communications, including LOTUS NOTES software, Apple Computer's AOCE, and Oracle Secure SQL. It is also part of the Cellular Digital Packet Data specification. LOTUS NOTES is a trademark of International Business Machines Corporation.

RC4 is a variable-key size stream cipher with byte-oriented operations. The algorithm is based on the use of a random permutation and the period of the cipher is likely to be greater than $10^{100}$. RC4 uses a 256 byte table substitution box (Sbox) that is initialized and permuted with a variable sized key. That is, the table entries are a permutation of the numbers 0 through 255, and the permutation is a function of the variable-length key. Each byte of the plaintext to be encrypted is XORed with a random byte from the table and the table contents are continually shuffled as each byte of the message is processed.

RC4 is usually implemented in software using one or more general purpose processors. However, an ever growing demand for bulk data encryption in wireless and wire line networks is driving the need for hardware accelerators and co-processors capable of processing data faster than existing software implementations.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown. In the drawings.

DETAILED DESCRIPTION OF PREFERRED EMBODIMENTS

Figure 1:
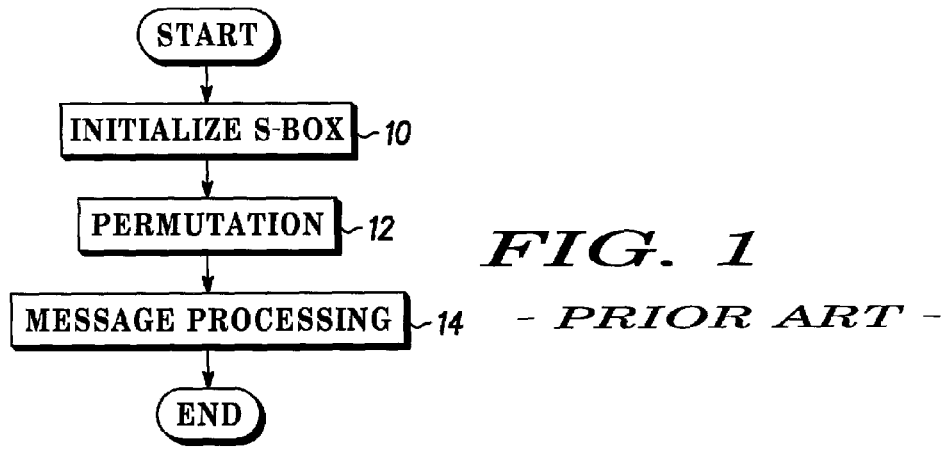
FIG. 1 is a high-level flow chart of the RC4 algorithm.

The detailed description set forth below in connection with the appended drawings is intended as a description of the presently preferred embodiments of the invention, and is not intended to represent the only forms in which the present invention may be practiced. It is to be understood that the same or equivalent functions may be accomplished by different embodiments that are encompassed within the spirit and scope of the invention. In the drawings, like numerals are used to indicate like elements throughout.

The present invention is an encryption engine or hardware accelerator that supports the RC4 algorithm. The encryption engine includes a finite state machine that operates in four modes, initialization, permutation, message processing, and idle/ready. The engine also has an Sbox memory that is accessed using four pointers. A programmable counter is used to select each byte of the variable sized key during Sbox permutation. Preferably, the Sbox is implemented with a dual port RAM and a read-ahead approach is used to maximize data throughput. Additionally, a working register is used to double buffer the input to allow new data to be written while the current sub-message is being processed.

Referring now to FIG. 1, a high-level flow chart of the RC4 algorithm is shown. The algorithm has three main steps or phases. The first step 10 is an initialization step in which the Sbox or state table is initialized. The Sbox is initialized by setting each location equal to an index value. For example, for a 256 element array, then for i=0 to 255, Sbox[i]=i. A second, key array of the same size is filled with the key value, repeating bytes as necessary.

The second step 12 generates permutations of the Sbox entries with a variable length key and stores them back into the Sbox. An example of the second, permutation step 20 follows.

for i=0 to 255:
j=(j+Sbox[i]+Key[i]) mod 256
swap Sbox[i] and Sbox[j].

The Sbox now contains random permutations of its original entries. Further, the Sbox evolves with use. The index i ensures that every entry changes and the index j ensures that the entries change randomly.

In a third, message processing step 14, random Sbox entries are used to either convert a message to ciphertext or recreate a message from ciphertext. Pseudo code for the message processing step 30, in which a message is converted to ciphertext follows.

i=j=0;
for each byte of the message,
begin
   i=(i+1) mod 256
   j=(j+Sbox[i]) mod 256 swap Sbox[i] and Sbox[j]
   k=(Sbox[i]+Sbox[j]) mod 256
   ciphertext byte=message byte XOR Sbox[k]end.

In order to decrypt an encrypted message, only the XOR step is changed, such that a message is equal to ciphertext XORed with Sbox[k].

Figure 2:
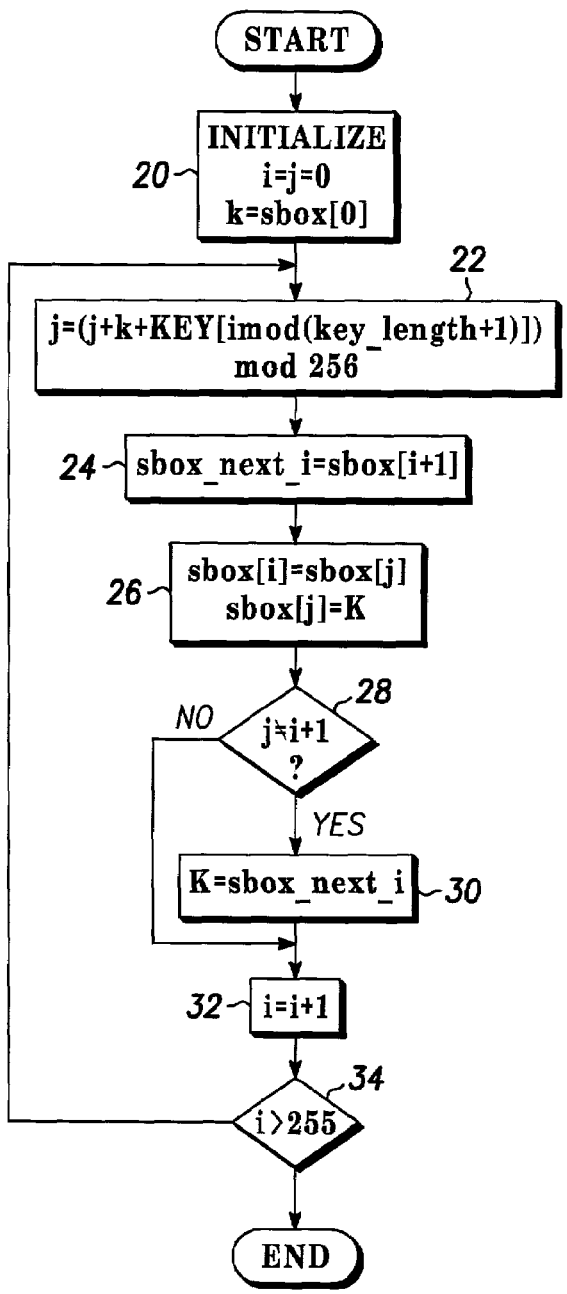
FIG. 2 is a high-level flow chart of a permutation step of the RC4 algorithm in accordance with the present invention.

Referring now to FIG. 2, a flow chart of the permutation step in accordance with the present invention is shown. The present invention recognizes and takes advantage of the fact while the value of index "j" is dependent on the index "i", the index "i" is a simple counter from 0 to 255. Thus, using the appropriate hardware, Sbox[i+1] can be read at substantially the same time as Sbox[j]. Although the algorithm becomes more complex, a hardware implementation using a dual-port RAM eliminates the need to read Sbox[i] and Sbox[j] in separate cycles.

In a first step 20, certain variables and the indexes i and j are initialized. That is, indexes i and j are set to zero and variable K is set to Sbox[0]. The variable K is used later during a swapping step. In a next step 22, the RC4 permutation calculation is performed. The permutation calculation is performed according to equation 1.

$$j=(j+K+\text{key}[i \bmod(\text{key\_length}+1)]) \bmod 256 \quad (1)$$

The difference from the standard RC4 algorithm is the use of the variable K instead of Sbox[i]. In the first iteration, K=Sbox[0]. However, in subsequent iterations, K is equal to sbox_next_i, which is Sbox[i+1], as defined at step 30. It will be understood by those of skill in the art that "key[i mod(key_length+1)]" could be replaced with key[i].

In a next step 24, Sbox[i+1] is fetched and the variable sbox_next_i is set to Sbox[i+1]. Step 24 is followed by step 26, which is a swapping step. In step 26, Sbox[i] is set to Sbox[j] and Sbox[j] is set to Sbox[i+1]. In the hardware implementation described below, an Sbox register L is used to facilitate the swapping function.

Then, at a next step 28, the value of the index j is compared to (i+1). If the index j is not equal to (i+1), then step 30 is executed, which sets K equal to sbox_next_i (i.e. Sbox[i+1]). After step 28, or step 30 if j is not equal to (i+1), the index i is incremented and the algorithm is repeated until the index i is greater than 255, as indicated by steps 32 and 34. It is understood by those of skill in the art that the loop is not necessarily repeated 255 times, but that the value of i is determined by the size of the Sbox and that the modulo arithmetic also depends on the size of the Sbox.

Figure 3:
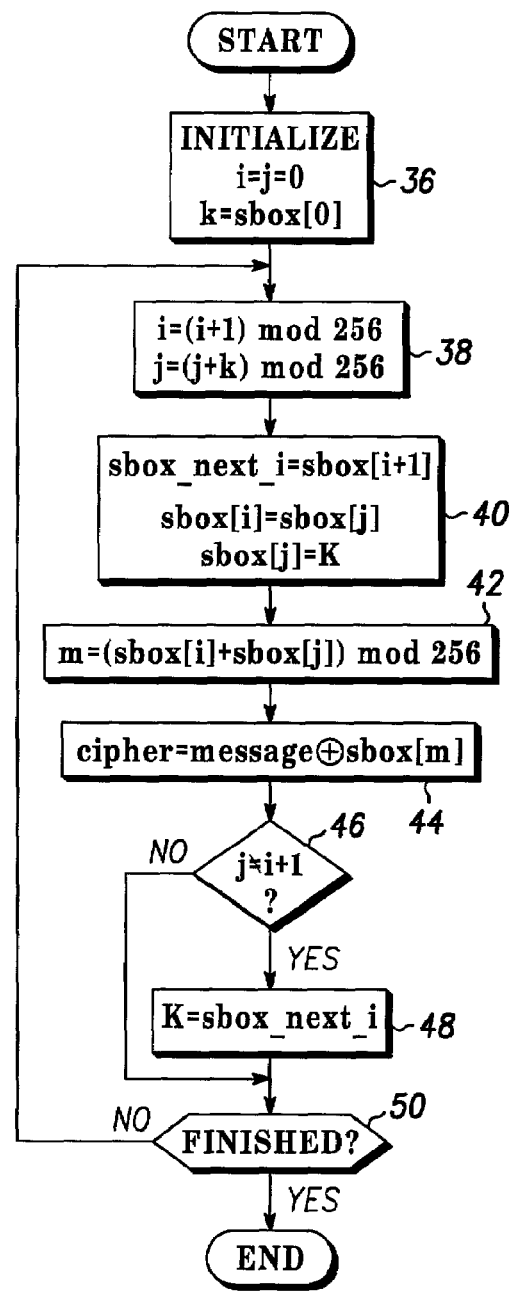
FIG. 3 is a high-level flow chart of a message processing step of the RC4 algorithm in accordance with the present invention.

FIG. 3 is a flow chart of a message processing step with read-ahead in accordance with the present invention. A first step 36 is the same as the first step 20 in FIG. 2, in which certain variables and the indexes i and j are initialized. That is, indexes i and j are set to zero and variable K is set to Sbox[0]. In a next step 38, standard RC4 processing calculations are performed, followed by a swapping step 40. The standard RC4 processing calculations are setting the index i equal to ((i+1) mod 256) and the index j equal to ((j+k) mod 256). In the swapping step 40, Sbox[i] is set to Sbox[j]. However, rather than setting Sbox[j] equal to Sbox[i], Sbox[j] is set to the variable K, which has a value of Sbox[i+1] or sbox_next_i. As in the permutation step, the Sbox register L is used to facilitate the swapping function.

Step 40 is followed by step 42, which determines a pseudorandom byte in accordance with the RC4 algorithm. That is, M=(Sbox[i]+Sbox[j]) mod 256. Next, in step 44, a byte of the ciphertext is generated by XORing a byte of the message with the pseudorandom byte from the Sbox, i.e., Sbox[M]. In a decrypting process, a byte of the ciphertext is XORed with the pseudorandom Sbox byte to recreate a byte of the message. Step 44 is followed by step 46, which checks to determine whether or not j is equal to i+1. If j is not equal to i+1, then the variable K is equated to Sbox[i+1] using the variable Sbox_next_i at step 48. Alternatively, if j is equal to i+1, then if the last byte of the message has not yet been processed, as determined at step 50, the algorithm is repeated by looping back to step 38. Step 48 is also followed by step 50.

Figure 4:
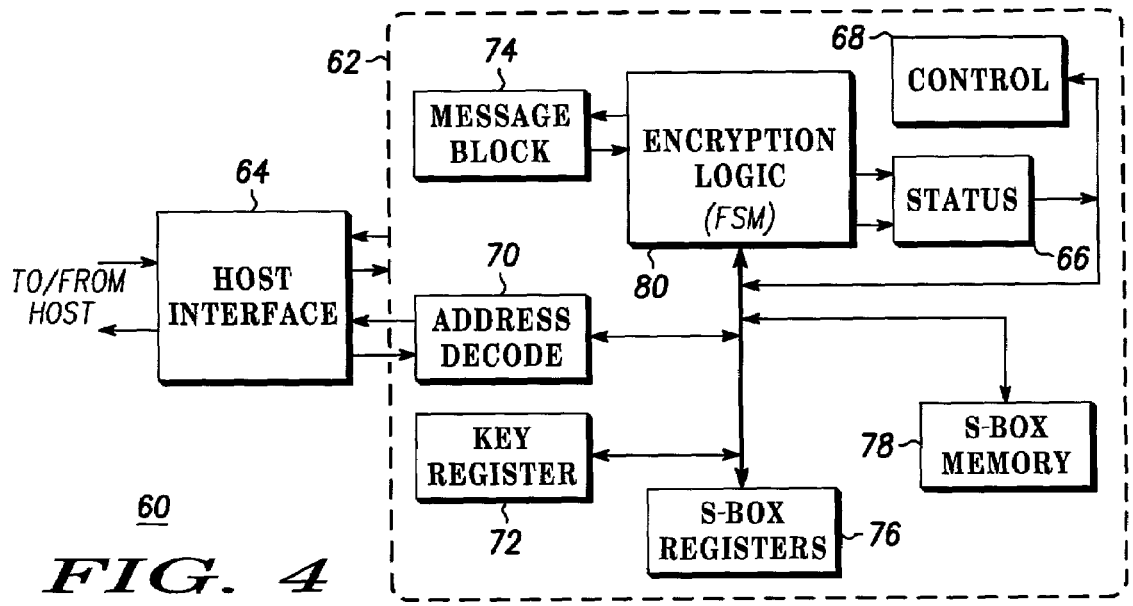
FIG. 4 is a schematic block diagram of a symmetric key stream cipher device in accordance with an embodiment of the invention.

Referring now to FIG. 4, a schematic block diagram of a symmetric key stream processor 60 in accordance with an embodiment of the invention is shown. The symmetric key stream processor 60 is a hardware accelerator having a main processing block 62 and a host interface 64. The main processing block 62 includes a status register 66, a control register 68, an address decoder 70, a key register logic 72, a message block 74, an Sbox registers block 76, an Sbox memory 78 and an encryption logic block 80.

The host interface 64 is a bridge between a host computer or processor or external circuitry and the main processing block 62. However, it is understood that a host or other circuitry may be formed on the same substrate as the host interface 64 and the main processing block 62. The host interface 64 resynchronizes the timing signals from the host. That is, the host interface 64 converts the timing signals to a synchronous interface for the main processing block 62. The resynchronization of the timing signals allows for a consistent, generic interface to the key stream processor 60 from different hosts. The host interface 64 passes all data, address and control signals between a host and the main processing block 62. The host interface 64 presents a simple, memory mapped architecture, which minimizes the need for special glue logic outside of the key stream processor 60.

The status register 66 is connected to the encryption logic block 80 and to the host interface 64 by way of the address decoder 70. The status register 66 is used to indicate the state of the key stream processor 60 and includes such information as busy, initialization complete, permutation stage complete, message processing complete, ready to receive next sub-message, and interrupt pending. In the presently preferred embodiment, the status register has seven bits as shown in Table 1.

Bit 0 indicates that the main processing block 62 is busy. Bit 1 indicates an interrupt is pending. The cause of the interrupt can be determined from the bit condition bits 2–6.

TABLE 1

| Bit | Name | Cause of Assertion |
|---|---|---|
| 0 | Busy | Initializing, permuting, processing or writing to memory |
| 1 | IRQ | Interrupt pending |
| 2 | Init. Complete | Sbox initialization complete |
| 3 | Permute complete | Sbox permutation complete |
| 4 | Sub-msg complete | Sub-message processing complete |
| 5 | Full-msg complete | Last sub-message processing complete |
| 6 | Input buffer empty | Next sub-message may be written to main processing block 62 |

The control register 68 is connected to the host interface 64 by way of the address decoder 70. The control register 64 is used to reset the main processing block 62 and to mask interrupts. In the presently preferred embodiment, the control register 68 has two bits. A first bit is for masking or disabling interrupts and a second bit is for triggering a software reset. Similar to the software reset, the preferred embodiment also includes a hardware reset that is triggered via an input to the host interface 64, e.g., a reset pin (not shown).

Figure 5:
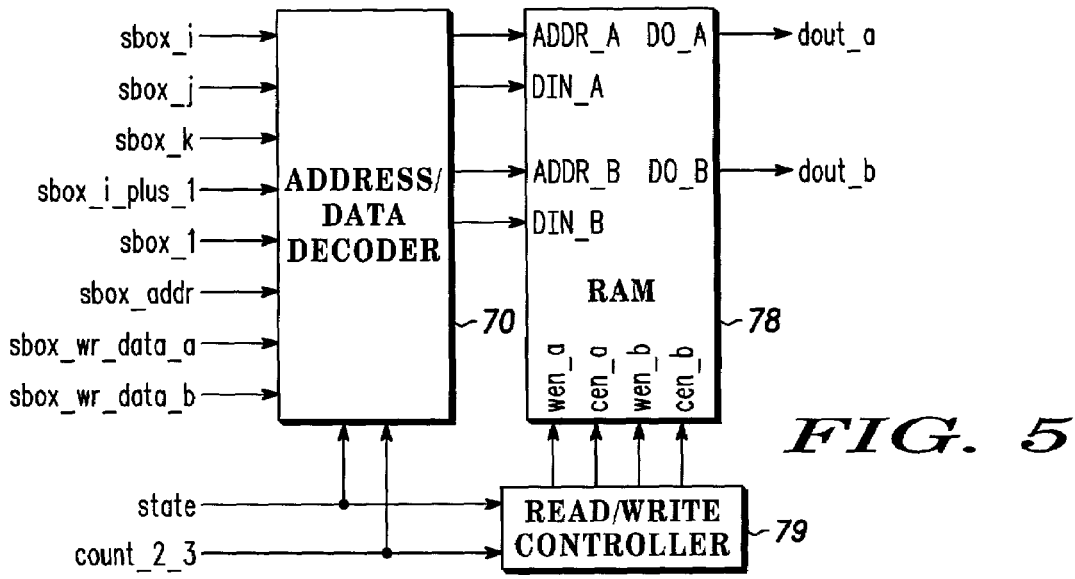
FIG. 5 is a schematic block diagram of an Sbox memory of the symmetric key stream cipher device of FIG. 4.

Referring now to FIG. 5, the Sbox memory 78 preferably comprises a 256×8-bit synchronous dual-port RAM having 8-bit wide address and data lines. The Sbox memory 78 is connected to the address decoder 70. Further, the Sbox memory 78 includes a read/write controller 79. The dual port RAM can be treated as two separate RAMs (A and B), with each having an address (ADDR_A, ADDR_B), a data-in port (DIN_A, DIN_B), data-out port (DO_A, DO_B), and independent write enables (WE_A, WE_B) and chip enables (CE_A, CE_B). The A and B RAMs share a common clock signal. The dual port architecture is used for efficiency during permutation and message processing, as described above with reference to FIGS. 2 and 3. Since dual port RAMs are understood by those of skill in the art, further description of the RAM architecture is not required for a complete understanding of the invention.

The Sbox registers block 76 includes four 8-bit registers Sbox I, Sbox J, Sbox K, and Sbox L that store Sbox pointers I, J, K and L. The Sbox I and Sbox J registers are used to store the i and j indexes or pointers (see FIGS. 1–3) and the Sbox K and Sbox L registers are temporary storage registers used to perform the swapping functions of the modified RC4 algorithm. That is, the K and L registers are used to swap the data stored in any two locations in the Sbox memory 78. The Sbox I and J registers are accessible to the host for the purpose of context reads and context writes in order to restore the I and J pointers to their current values, in the case of an interrupt, after the interrupt processing is finished.

Although FIG. 4 shows a bus structure connecting the different functional blocks of the main processing block 62, the status and control registers 66 and 68 and the Sbox registers 76 preferably are connected by a virtual bus defined by numerous internal signals and controlled by the encryption logic block 80 and an internal address signal IADDR.

Figure 6:
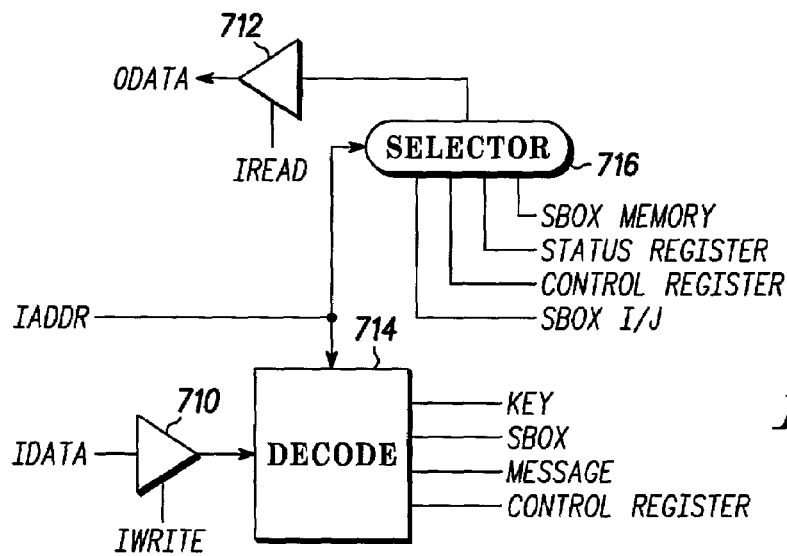
FIG. 6 is a schematic block diagram of an address decoder of the symmetric key stream cipher device of FIG. 4.

Referring now to FIG. 6, a high level block diagram of a portion of the address decoder 70 is shown. The address decoder 70 includes an input buffer 710, an output buffer 712, a decoder 714 and a selector 716. The input buffer 710 receives input data IDATA from the host interface 64. The input data IDATA represents sbox_wr_data_a and sbox_wr_data_b shown in FIG. 5. The input data IDATA can include key data, message text, ciphertext and control information. The input buffer 710 is enabled by an IWRITE signal (i.e., wen_a and wen_b of FIG. 5) received from the host interface 64. The decoder 714 is connected to the input buffer 710 and receives the input data IDATA. The decoder 710 also receives the internal address signal IADDR from the host interface 64. As is understood by those of skill in the art, the sbox address can also be designated by the index registers i and j. The decoder 714 formats and specifies the input data as key information, Sbox information, a message, or control register data, depending on the value of the internal address signal IADDR. The key information includes key data and key length and is provided to the key register logic 72 and to the message block 714. The Sbox information includes Sbox I and J index values and data to be written to the Sbox memory 78. The decoder 714 can also pass message bytes to the message block 74 by way of the encryption logic block 80. The decoder 714 also identifies information to be stored in the control register 68.

The output buffer 712 transmits output data ODATA from the selector 716 to the host interface 64. The output buffer 712 is enabled by an IREAD signal received from the host interface 64. The selector 716, under the control of the IADDR signal, passes data to the ouput buffer 712. The data transmitted to the output buffer 712 from the selector 716 includes data read from the Sbox memory 78 (dout_a and dout_b shown in FIG. 5), data read from the status register 66, data from the control register 68, data from the Sbox registers 76, and message or cipher text. As previously discussed, the internal address signal IADDR is generated by the host interface 64.

Figure 7:
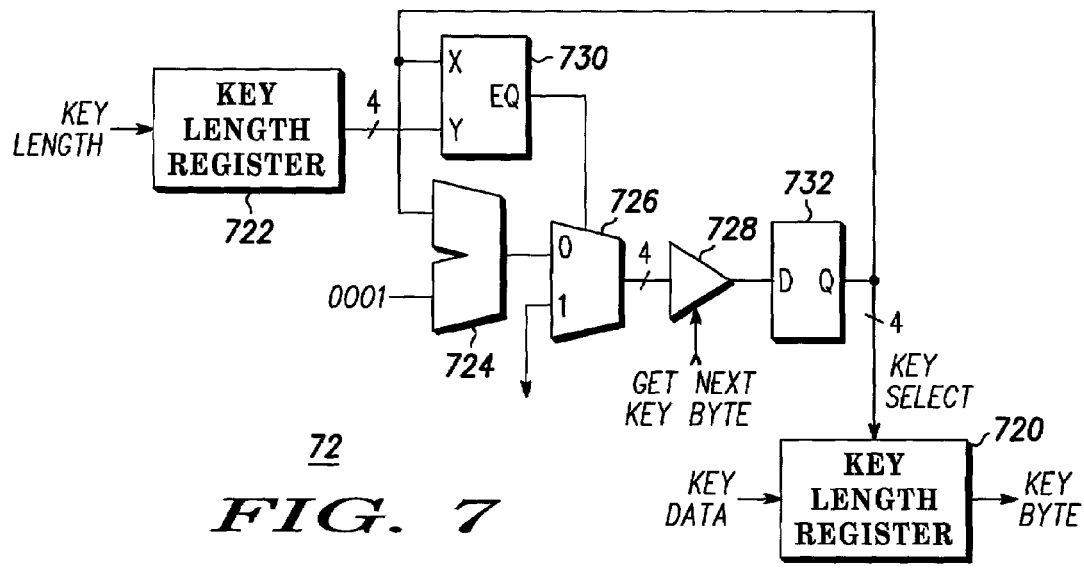
FIG. 7 is a schematic block diagram of a key byte pointer of the symmetric key stream cipher device of FIG. 4.

FIG. 7 is a high level schematic block diagram of one embodiment of the key register logic 72 in accordance with a preferred embodiment of the invention. The key register logic 72 includes a key register 720 that in the preferred embodiment is a 16 byte (128 bits) write-only register that holds the encryption key. The key register 720 includes separately addressable blocks. That is, each byte of the key data stored in the key register 720 is separately addressable, as specificed by a pointer signal, key_select. Since the key can vary in length, the key register logic 72 includes a 4 bit write-only register 722 that holds the key length, i.e., the number of bytes in the current key. In a preferred embodiment, the key length register 722 is independently addressed. The key register 720 and the key length register 722 receive key data and key length data, respectively, from the host interface 64 by way of the address decoder 70.

The key register logic 72 also includes a first counter 724, which in the preferred embodiment is a 4-bit counter. The first counter 724 is used to generate the pointer signal, key_select, which is used to select a new byte of the key during Sbox permutation (FIG. 2). Each time the first counter 724 is incremented, a new byte of the key stored in the key register 720 is selected. Since the key length can vary, the first counter 724 is programmable. In order to implement the following equations (2) and (3), the key register logic 72 includes a second counter 726 and a comparator 730.

$$\text{key\_select} = \text{count mod(key\_length+1)} \quad (2)$$

$$\text{key\_byte} = \text{key\_data[key\_select]} \quad (3)$$

A buffer 728 is connected between the counter 726 and a 4-bit key_select register 732. The buffer 728 is enabled when fetching the next key byte. The key_select register 732 stores the current key_select pointer.

Figure 8:
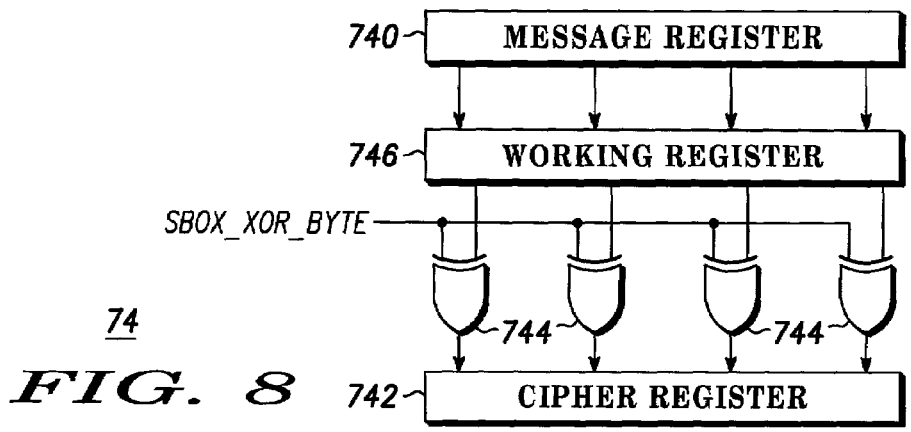
FIG. 8 is a schematic block diagram of a message processing block of the symmetric key stream cipher device of FIG. 4.

Referring now to FIG. 8, the message block 74 includes a message register 740 and a cipher register 742. In a preferred embodiment, the message register 740 is a 32-bit write-only register that stores plain text and the cipher register 742 is a 32-bit read-only register that stores encrypted text or ciphertext. The opposite is true for the inverse cipher (decryption). In the presently preferred embodiment, each 32 bits of message data, referred to herein as a sub-message, stored in the message register 740 is processed one byte at a time. The message byte read from the message register 740 is XORed with one byte from the Sbox memory 78 (sbox_xor_byte) by a plurality of XOR gates 744 and the resulting ciphertext is stored in the cipher register 742. In FIG. 8, the XOR gates 744 each represents plural XOR gates, such as 8 XOR gates.

To reduce idle time between sub-messages, a working register 746 is used to hold the sub-message while it is being processed, which allows the host to write the next sub-message to the message register 740 while the current sub-message is being processed. Upon receiving a new sub-message from the host, an internal new message flag is set. The new message flag in turn clears an input empty status bit. When the sub-message in the working register 746 has been processed and is stored in the cipher register 742, the contents of the message register 740 are transferred to the working register 746 and processed. At this point, the input empty status bit is set, indicating to the host that the next sub-message may be written to the message register 740. Although the implementation shown in FIG. 8 processes the message text a byte at a time, the number of XOR gates could be increased as desired. For example, the message text could be processed two bytes at a time or even a word at a time.

The function of the encryption logic block 80 can be broken into three separate tasks: SBox initialization, SBox permutation, and message processing. By nature, the RC4 algorithm allows some overlap of hardware elements for these three tasks, such as counters, adders and the XOR gates 744 (FIG. 8). The encryption logic block 80 is responsible for controlling the Sbox memory address and input data and controlling the Sbox I, J, K and L registers. In the presently preferred embodiment, the host interface 64 uses a 32-bit data bus, which allows four sequential bytes of the Sbox memory 78 to be accessed during one host bus cycle. The Sbox memory 78 can be accessed to retrieve or restore the message context (state) at any point in the message stream. The address written to the key stream processor 60 denotes the starting address/offset in the Sbox memory 78. A 2-bit counter's value is added to the base address as each sequential byte is read/written to the Sbox memory 78.

As discussed with reference to FIGS. 2 and 3, to increase performance of permutation and message processing, the value i+1 is used in the modified algorithm. Accordingly, an i_plus_1 register (not shown) is used to hold the value of index i plus one. The i_plus_1 register is used to read the contents of the Sbox memory 78 at location i+1. This read-ahead approach is possible because the value of i is always known because it is simply the output of an 8-bit counter.

At the start of the permutation or message processing phases, a one-time read is performed to obtain the contents of the Sbox memory 78 at location i=0. The contents are stored in a "dout_next_i" register. This value is used to calculate the index j for the first iteration. For each subsequent iteration, the Sbox memory 78 contents at location i+1 are read in the same cycle as the contents of j. This approach makes full use of the dual-port RAM and eliminates one read cycle. The calculated value of j and the data written to location j during the swap uses the value of "dout_next_i" from the previous iteration. In the event that j=i+1, "dout_next_i" holds its value from the previous iteration. Table 2 shows the memory usage and data flow.

TABLE 2

| STATE | INIT | PERMUTE | | | SUB-MESSAGE PROCESS | | | |
|---|---|---|---|---|---|---|---|---|
| Cnt_2_3 | xx | 0** | 0 | 1 | 0** | 0 | 1 | 2 |
| ADDR_A | I | I | I + 1 | I | I | I + 1 | J | K + L |
| DIN_A | I | — | — | L | — | — | L | — |
| WEN_A | 1 | 0 | 0 | 1 | 0 | 0 | 1 | 0 |
| DO_A | xxx | next i | next i | xxx | next i | next i | xxx | XOR w/MSG |
| ADDR_B | — | — | J | J | — | J | J | — |
| DIN_B | — | — | — | K | — | — | L | — |
| WEN_B | 0 | 0 | 0 | 1 | 0 | 0 | 1 | 0 |
| DO_B | xxx | xxx | L | xxx | xxx | L | xxx | xxx |

At the locations in the table including a "**" one time reads are performed to calculate j in the next iteration. Each subsequent iteration's k value is "next i" from the previous iteration.

The encryption logic block 80 operates in accordance with a finite state machine (FSM) that has 7 states: reset, S-box initialization, initialization done/wait for key, S-box permutation, permutation done/wait for message, sub/full message process, and sub-message done. The state machine is dependent on the variables: Reset, Sbox write, Busy (Intializing, permuting, message processing), Full message done (last sub-message complete), and Current state. The state definitions are shown in Table 3.

As is apparent, the present invention provides a symmetric key stream-cipher architecture implemented in a heterogeneous integrated circuit. More particularly, the key stream-cipher architecture implements the RC4 algorithm. In one embodiment, the encryption engine is suitable for multi-mode and multi-band cellular telephones. It is to be understood, however, that this invention is not limited to the particular embodiments disclosed, but covers modifications within the spirit and scope of the present invention as defined by the appended claims.

TABLE 3

| Reset_B | Context Write | Busy | Full Done | From State | To State | Description |
|---|---|---|---|---|---|---|
| 0 | ? | ? | ? | ? | 0 | Reset |
| 1 | 0 | 0 | 0 | 0 | 0 | Idle (reset done) |
| 1 | 0 | 1 | 0 | 0 | 1 | Start Sbox init |
| 1 | 0 | 1 | 0 | 1 | 1 | Sbox init (busy) |
| 1 | 0 | 0 | 0 | 1 | 2 | Sbox init done |
| 1 | 0 | 0 | 0 | 2 | 2 | Wait for key |
| 1 | 0 | 1 | 0 | 2 | 3 | Start Sbox perm |
| 1 | 0 | 1 | 0 | 3 | 3 | Sbox perm (busy) |
| 1 | 0 | 0 | 0 | 3 | 4 | Perm/sub done |
| 1 | 0 | 0 | 0 | 4 | 4 | Wait for sub-msg |
| 1 | 1 | ? | ? | ? | 4 | Context write |
| 1 | 0 | 1 | 0 | 4 | 5 | Start-msg proc |
| 1 | 0 | 1 | 0 | 6 | 5 | Next-msg proc |
| 1 | 0 | 1 | 0 | 5 | 5 | Sub-msg proc |
| 1 | 0 | 0 | 0 | 5 | 6 | Sub-msg done |
| 1 | 0 | 0 | 0 | 6 | 6 | Wait for next msg |
| 1 | 0 | 0 | 1 | 5 | 0 | Full msg done |

The invention claimed is:

1. A key stream cipher device, comprising:
a key register for storing an encryption key;
a counter for generating a key select pointer, the key select pointer specifying a portion of the encryption key stored in the key register;
an Sbox memory for storing a predetermined number of bytes of state data;
a plurality of Sbox registers for storing a plurality of Sbox pointers that point to predetermined bytes of the state data stored in the Sbox memory;
an encryption logic block, connected to the Sbox memory and the key register, for initializing the Sbox memory in an initialization mode, for generating permutations using the encryption key in a permutation mode, and controlling message processing in a message processing mode;
a message block, connected to the Sbox memory and the encryption logic block, for processing a message when the encryption logic block is in the message processing mode by combining selected bytes of state data read from the Sbox memory with one of the message and ciphertext, wherein in an encryption mode, the message block encrypts the message to generate ciphertext, and in a decryption mode, the message block decrypts ciphertext to recreate a message, the message block including a message register for holding a first predetermined portion of the message, a working register for holding a second predetermined portion of the message previously stored in the message register, and a cipher register for storing one of a portion of the ciphertext and the recreated plaintext; and a status register that stores a plurality of flags indicating a status of the modes of the cipher device, the modes including the initialization mode, the permutation mode, and the message processing mode, and wherein the status register is updated after each time the status register is read.

2. The key stream cipher device of claim 1, wherein the Sbox memory comprises a synchronous dual-port random access memory (RAM) having separate address and data lines.

3. The key stream cipher device of claim 1, further comprising a host interface for passing all data, address and control signals between a host processor and the cipher device.

4. The Key stream cipher device of claim 1, wherein the register is a read only register.

5. The key steam cipher device of claim 4, wherein the plurality of mode flags of the status register include an initialization complete flag, a permute complete flag, and a message complete flag.

6. The key stream cipher device of claim 1, further comprising a control register for masking interrupts to the cipher device and for triggering a reset of the cipher device.

7. The key stream cipher device of claim 1, wherein the encryption key comprises a plurality of bytes, said plurality of bytes being stored in the key register, and wherein said plurality of bytes can be defined as a plurality of sets of bytes, wherein each of said set of bytes is independently addressable.

8. The key stream cipher device or claim 1, wherein the encryption key has a variable length and the key register includes a programmable field for indicating the length of the encryption key.

9. The key stream cipher device of claim 1, wherein the message block includes:
an XOR block for exclusive ORing the data stored in the working register with the data from the Sbox to generate one of the ciphertext and the recreated message text.

10. The key stream cipher device of claim 9, wherein the message register is a write-only register and the cipher register is a read-only register.

11. The key stream cipher device of claim 1, wherein the plurality of Sbox registers includes first and second index registers and first and second variable registers, wherein the variable registers are used for swapping bytes of the state data stored in the sbox memory.

12. An improved method of encrypting a message using a stream cipher in a processor, the stream cipher including an initialization step, a permutation step a message processing step and a key, and the processor coupled to a substitution box memory, the improvement comprising a modification to the permutation step, the modified permutation step comprising the steps of:

initializing first and second index values i and j in the substitution box memory;

initializing a first variable K in the substitution box memory;

performing a permutation calculation using the processor as:

$i=(j+K+key[i])$ mod n, where n is a length of the key;

reading a next value from the substitution box memory, the next value being pointed to by the index i plus one;

setting a value at the substitution box memory location pointed to by the index i with a value at the substitution box memory location pointed to by the index j;

setting a value at the substitution box memory location pointed to by the index j with the variable K;

comparing the values of the indexes i and j; setting the variable K equal to the next value read from the substitution box memory in the reading step;

incrementing the index i; and repeating the above steps starting with the performing step a predetermined number of times, and after the predetermined number of times setting a bit of a status register to indicate the permutation step is complete.

13. The improved encryption method of claim 12, wherein in the variable K is set equal to the next value read from the substitution box memory when the values of the indexes i and j are not equal.

14. The improved encryption method of claim 12, wherein the predetermined number of repeating times depends on the length of the key.

* * * * *

UNITED STATES PATENT AND TRADEMARK OFFICE
CERTIFICATE OF CORRECTION

PATENT NO. : 7,043,017 B2
APPLICATION NO. : 09/953665
DATED : September 13, 2001
INVENTOR(S) : Richard J. Swindlehurst It is certified that error appears in the above-identified patent and that said Letters Patent is hereby corrected as shown below:

In Column 10, Line 17, Claim No. 12:

Change "i=(j+K+key[i])" to -- j=(j+K+key[i]) --

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

PATENT NO.         : 7,043,017 B2                                           Page 1 of 1
APPLICATION NO.  : 09/953665
DATED                 : May 9, 2006
INVENTOR(S)         : Richard J. Swindlehurst It is certified that error appears in the above-identified patent and that said Letters Patent is hereby corrected as shown below:

In Column 10, Line 17, Claim No. 12:

Change "i=(j+K+key[i])" to -- j=(j+K+key[i]) --

This certificate supersedes the Certificate of Correction issued May 27, 2008.

Signed and Sealed this

Twenty-fourth Day of June, 2008

JON W. DUDAS
*Director of the United States Patent and Trademark Office*